UNITED STATES PATENT OFFICE.

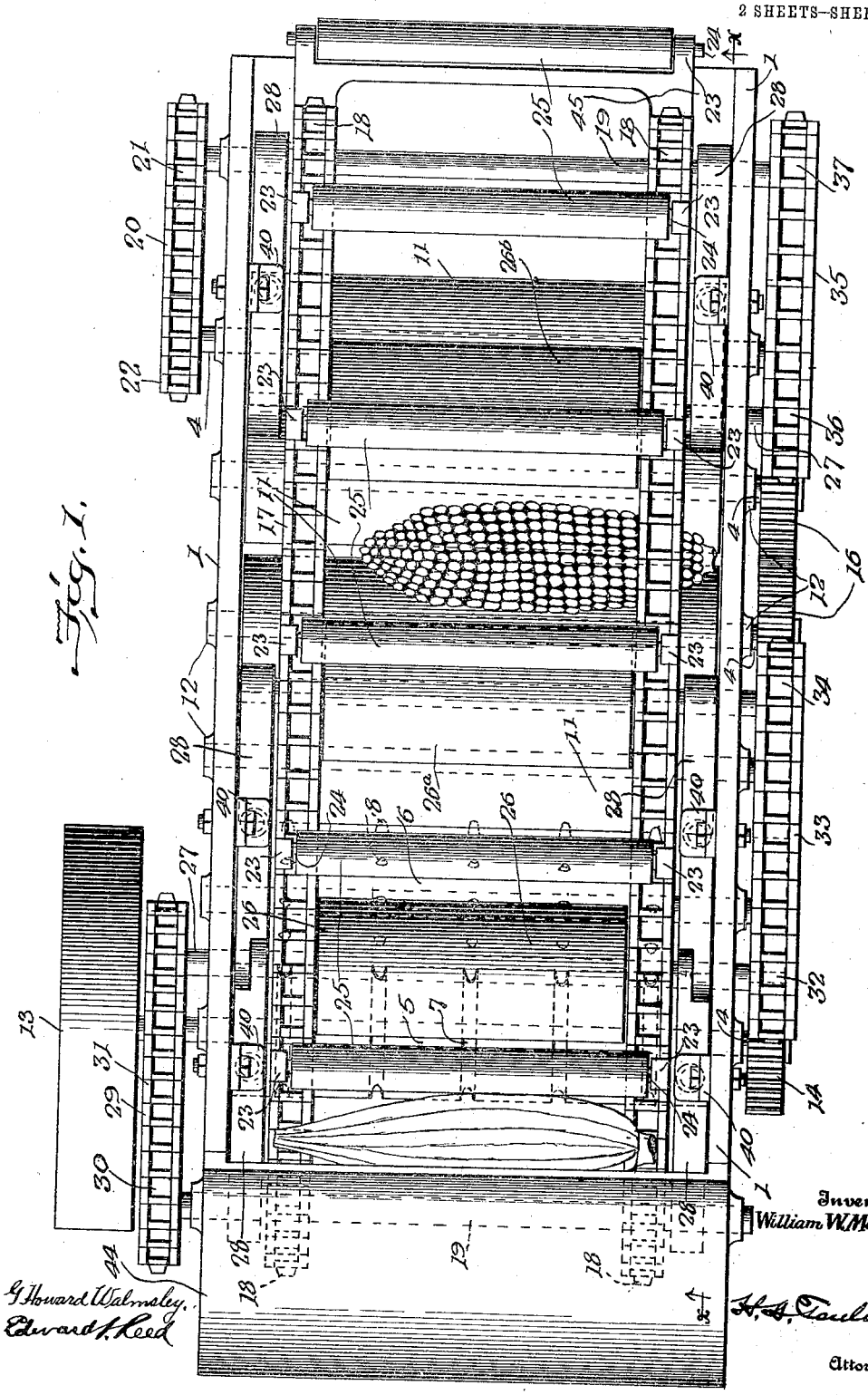

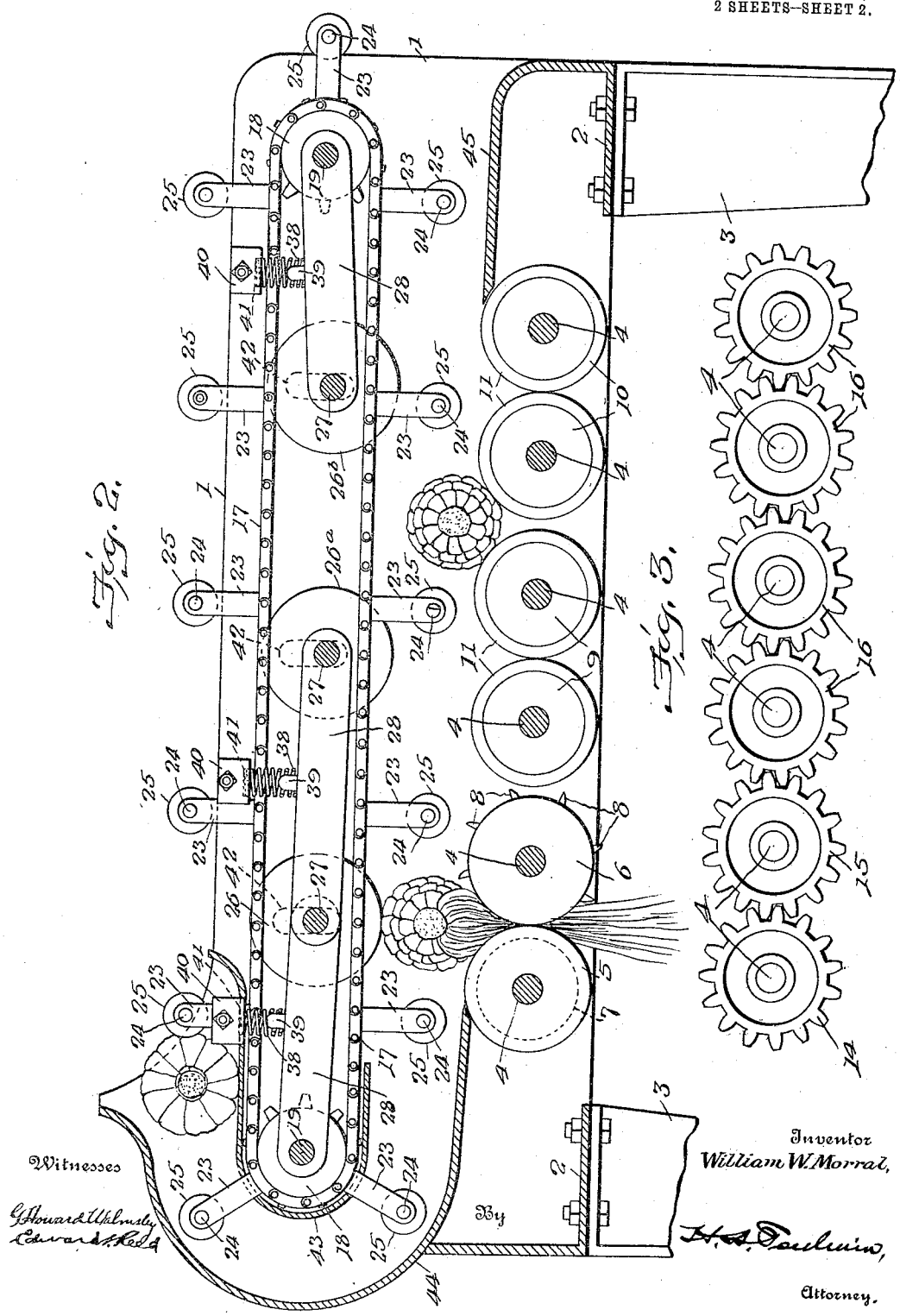

WILLIAM W. MORRAL, OF MORRAL, OHIO, ASSIGNOR OF ONE-HALF TO SAMUEL E. MORRAL, OF MORRAL, OHIO.

CORN-HUSKING MACHINE.

1,121,938.   Specification of Letters Patent.   Patented Dec. 22, 1914.

Application filed June 27, 1907, Serial No. 381,005. Renewed October 22, 1913. Serial No. 796,729.

*To all whom it may concern:*

Be it known that I, WILLIAM W. MORRAL, a citizen of the United States, residing at Morral, in the county of Marion and State of Ohio, have invented certain new and useful Improvements in Corn-Husking Machines, of which the following is a specification, reference being had therein to the accompanying drawings.

The present invention relates to corn husking machines, and the object of the invention is to produce a machine which will completely remove the husk from an ear of corn without shelling out the grains of corn in the case of ripe corn or crushing the grains where green corn is being husked.

To this end it is a further object of the invention to provide means for holding the corn in engagement with the husking rollers and rotating the same while thus held in engagement; and also to provide positive means for feeding the corn along the husking rollers and permitting the ear to be rotated as it is thus fed.

With these objects in view my invention consists in certain novel features of construction and in certain parts and combinations hereinafter to be described, and then more fully pointed out in the claims.

In the accompanying drawings, Figure 1 is a top plan view of a corn husker embodying my invention; Fig. 2 is a vertical sectional view, taken on the line $x$ $x$ of Fig. 1; and Fig. 3 is a side elevation of a portion of the machine, showing the gears for the husking rollers.

In these drawings I have illustrated the preferred form of my invention and have shown the same as provided with a plurality of pairs of husking rollers, extending transversely of the length of the machine, and positively rotated rollers mounted above the pairs of husking rollers and adapted to engage the ear of corn and hold the same in engagement with the husking rollers and rotate the same while so held, together with an endless belt for positively feeding the corn transversely of the length of the husking rollers, but, obviously, the arrangement of the rollers and the character of the holding and rotating devices, as well as the feeding mechanism, may be varied without departing from the spirit of the invention. In the form here shown, the machine comprises a frame consisting of vertically extending side plates 1, which are united by means of suitable transverse members 2 extending between the plates near the bottom thereof. This frame is supported upon suitable legs 3, which may be of any suitable character, and are preferably secured to the frame by bolting the same to the transverse connecting member 2. The side members 1 of the frame are spaced apart a distance sufficient to accommodate a large sized ear of corn and are of a length and height sufficient to inclose the husking rollers, together with the holding and feeding mechanism. Mounted near the lower part of the frame are one or more pairs of husking rollers secured to suitable shafts 4, which are journaled near their opposite ends in the side members 1 of the frame. These rollers may be of any suitable character to accommodate the same to the particular kind of corn which is being husked. As here shown, the first pair of rollers, 5 and 6, are roughened to enable the same to loosen the husk and afford a better gripping surface for removing the same. This roughened surface is preferably provided by forming a series of annular grooves 7 about the cylindrical surface of the roller 5 and providing the roller 6 with a plurality of annular series of teeth 8 of a length substantially equal to the depth of the grooves 7 and so arranged as to enter said grooves when the rollers are rotated. The rollers 9 and 10 of the next succeeding pairs have smooth cylindrical surfaces and are preferably provided with a covering 11, of rubber or the like, to afford a better gripping surface for seizing any portion of the husk which may remain upon the ear after it has passed the first pair of rollers 5 and 6. This arrangement of the rollers is designed particularly for husking green corn, and, as above stated, the arrangement may be varied to adapt the same to husk different kinds of corn. The opposite ends of the shafts 4, upon which the husking rollers are mounted, are preferably journaled in suitable bearings 12 formed in the side members 1 of the frame. The shaft of the roller 5 projects beyond the frame on both sides thereof and is provided at one side with a suitable driving pulley 13 and at the other side with a gear 14 which meshes with a similar gear 15 secured to the projecting end of the shaft upon which the roller 6 is mounted, thus causing the rollers 5 and 6 to rotate one toward the other. The gear 15 meshes with a corresponding gear 16 secured to the shaft of the next succeeding roller and this gear meshes with the next successive gear and so on, the shafts of each of the rollers being provided with suitable gears 16, whereby the rollers of each pair are rotated one toward the other.

Suitable means are provided for positively feeding the ears of corn transversely of the husking rollers and I prefer the form of feeding mechanism herein shown, which consists of an endless belt, here shown as a sprocket chain 17 mounted upon suitable sprocket wheels 18 which are mounted upon shafts 19 journaled in the frame members 1 near the opposite ends thereof. There are preferably two of the sprocket chains mounted near the opposite sides of the machine and adjacent to the inner walls of the side members 1. The shafts 19 carrying the sprocket wheels 18 may be rotated in any suitable manner, but preferably by means of a chain 20 which extends about a sprocket wheel 21, mounted on the end of the shaft 19, and about a similar sprocket wheel 22 mounted on the end of one of the shafts 4 of the husking rollers. The belts or chains 17 are provided with corresponding series of arms 23 secured thereto at intervals, and near the outer ends of these arms are mounted suitable feeding members, such as the shafts 24 upon which are mounted suitable rollers 25. As stated, the chains 17 are located on opposite sides of the machine and beyond the ends of the husking rollers, and the arms 23 are of such a length as to support the rollers 25 slightly above the upper surface of the husking rollers. Thus, when the machine is in operation, the sprocket chain is moved transversely of the length of the husking rollers and causes the arms 23 and the rollers 25 to move in a direction transversely of the length of said husking rollers and to carry the ears of corn from one pair of husking rollers to the next succeeding pair.

In order that the ear of corn may be held firmly in engagement with the husking rollers until the same have loosened and torn away the husk, I provide suitable means located above each pair of husking rollers and adapted to engage the ear of corn as it passes over said rollers and hold the same in engagement therewith, and also adapted to prevent the ear of corn tipping up on one end and choking the machine when the husking rollers grasp the small end of the ear. The means herein shown for this purpose consists of a plurality of rollers 26, 26$^a$ and 26$^b$, mounted upon shafts 27 which are journaled near the opposite ends of the rollers in arms 28 and which extend longitudinally of the husking rollers. The arms 28 are mounted at their outer ends upon the shafts 19, thus allowing the rollers to move in substantially vertical planes above the ear of corn. These rollers are positively rotated from the driving mechanism of the machine, preferably by means of a chain 29 which extends about a sprocket wheel 30 secured to the end of one of the shafts 19 carrying the sprocket wheels 18 and about a sprocket wheel 31 secured to the adjacent end of the shaft 27 upon which the roller 26 is mounted. Upon the opposite end of the shaft 27 carrying said roller 26 is a second sprocket wheel 32, about which extends a belt 33 which also extends about a similar sprocket wheel 34 on the shaft 27 of the adjacent roller 26$^a$. The roller 26$^b$ is rotated by means of a similar chain 35 extending about a sprocket wheel 36 mounted on the shaft 27, upon which the roller 26$^b$ is mounted, and about the sprocket wheel 37 mounted upon the adjacent shaft 19 carrying the sprocket wheels 18. These rollers 26, 26$^a$ and 26$^b$ may be held in engagement with the respective ears of corn by any suitable means, but I prefer to supplement the weight of the roller by means of suitable springs 38. These springs preferably extend between the arms 28, which are provided with suitable lugs 39 adapted to be inserted in the lower end of the spring, and the brackets 40 which are secured to the inner surfaces of the side members 1 and which are preferably provided with suitable recesses or seats 41 to receive the upper end of the springs 38. To permit the shafts 27 of the holding rollers to rise and fall in accommodating themselves to the various sizes of ears of corn, the apertures 42 in the side members 1 of the frame, through which said shafts extend, are elongated in a vertical direction, thus allowing the shafts a free vertical play. The amount of the vertical movement of the shafts 27 relatively to the length of the arms 28 is so slight that the arc of the circle through which the shaft moves is immaterial and is easily accommodated by slightly enlarging the elongated aperture or slot 42.

A suitable chute or guideway is provided for guiding the ears of corn to the husking rollers, and, in the form here shown, I have constructed this chute by providing a plate 43 which lies between the sprocket wheels 18 at the forward end of the machine and is curved in such a manner as to extend parallel with the sprocket chain 17 for a short distance above and below the sprocket wheels 18. A second plate 44 extends parallel with the plate 43 and is secured at its opposite edges to the side members 1 of the main frame. The distance between these plates is slightly greater than the length of the feeding arms and their rollers and a passage or chute is formed between the same of a size sufficient to accommodate an ear of corn. It will be noticed that that portion of the plate 44 forming the outer wall of the chute is substantially horizontal having, in the present instance, a very small degree of inclination. As the result an ear of corn as it passes down the chute will engage the preceding feeding roller 25 which will check its movement and when it passes onto the substantially horizontal portion of the chute it will come to a rest and remain thereon until it is engaged by the following feeding roller which will move the ear into a position parallel with itself and then onto the husking rollers. At the opposite or discharge end of the machine, the plate 45 is secured between the side members 1 of the frame and extends from a point near the upper surface of the last husking roller to the rear of the machine and serves to carry the ears of corn from said husking rollers to the receiving receptacle. Thus it will be seen that when an ear of corn is fed into the chute or passageway formed by the plates 43 and 44, the same is immediately engaged by one of the rollers 25, carried by the feeding arms 23 on the sprocket chains 27, and carried through said passageway and into engagement with the first pair of husking rollers. The roughened surfaces of this pair of rollers engage the husk of the ear and loosen the same and tear away the greater portion thereof. The ear is held firmly in engagement with the husking rollers while the rollers are acting upon the same by the holding roller 26 which is located immediately above the point of contact of the husking rollers and the rotation of the holding roller 26 serves to rotate the ear about its longitudinal axis, thus bringing every portion of the husk into a position to be engaged by the husking rollers. The roller 25, which is carried by the feeding belt, revolves about its longitudinal axis, and, when in engagement with the ear of corn, does not interfere with the rotation of said ear. The positive engagement of the feed rollers 25 with the ear of corn causes the same to move forward and does not permit of it becoming lodged between the husking roller. The ear is carried from the first pair of rollers to the second pair where it is further acted upon by the smooth rubber surfaces of these rollers and any of the soft inner husk, which may not have been removed by the roughened surface, is engaged by the smooth rollers and all the husk is thoroughly removed from the ear and the same carried out over the plate 45 to the discharge end of the machine.

From the foregoing description, it will be apparent that I have provided a machine adapted to husk ears of corn which have been snapped or broken from the stalk and to entirely remove the husk therefrom without damaging the ear of corn, and this is accomplished by feeding the corn positively along the husking rollers by means of a positive feed comprising an endless belt provided with arms carrying rollers adapted to engage the ears of corn, thus preventing rollers and moving the same from one set of the same from becoming lodged between the rollers to another; and by providing the holding rollers, which hold the ear of corn in engagement with the husking rollers to permit the latter to loosen the husk and remove the same, said rollers being positively rotated to rotate said ear of corn, thereby bringing every portion of the husk into position to be engaged by said husking rollers.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a corn husking machine, the combination, with the husking rollers, and means for holding an ear of corn in engagement therewith, of a belt moving transversely to said husking rollers, feeding members supported from said belt at a point removed therefrom and extending longitudinally of said husking rollers, and means for actuating said belt to cause said feeding members to engage said ear of corn.

2. In a corn husking machine, the combination, with the husking rollers, and means located above said husking rollers for holding an ear of corn in engagement therewith and for rotating said ear of corn, of a belt, feeding members suspended from said belt and extending longitudinally to said husking rollers and between said husking rollers and said holding means, and means for actuating said belt to cause said feeding members to engage said ear of corn.

3. In a corn husking machine, the combination, with the husking rollers, and means for holding an ear of corn in engagement therewith and for rotating the same, of endless belts mounted on opposite sides of said machine, arms depending from said belts, feeding members mounted on said arms and extending transversely to said machine, and means for actuating said belts in unison to cause said feeding members to engage said ear of corn.

4. In a corn husking machine, the combination, with the husking rollers, and means located above said husking rollers for holding the ear of corn in engagement therewith and for rotating said ear of corn, of feed mechanism comprising feed rollers adapted to be moved between said husking rollers and said holding means and to engage said ear of corn.

5. In a corn husking machine, the combination, with the husking rollers, and means located above said husking rollers for holding an ear of corn in engagement therewith and for rotating said ear of corn, of a belt, feed rollers carried by said belt and extending between said husking rollers and said holding means, and means for actuating said belt to cause said feed rollers to engage said ear of corn.

6. In a corn husking machine, the combination, with the husking rollers, and means for holding an ear of corn in engagement therewith and for rotating the same, of endless belts mounted on opposite sides of said machine, arms depending from said belts, and feed rollers extending transversely of said machine and journaled in said arms, and means for actuating said belts in unison to cause said feed rollers to engage said ear of corn.

7. In a corn husking machine, the combination, with the husking rollers, a holding roller extending longitudinally of said husking rollers, and means for rotating said holding rollers, of endless belts mounted on opposite sides of said machine, arms carried by said endless belts, feed rollers extending transversely of said machine and journaled in said arms, and means for actuating said belts in unison to cause said feed rollers to engage said ear of corn.

8. In a corn husking machine, the combination, with the husking rollers, and a feeding belt for moving an ear of corn over said husking rollers, of arms pivotally mounted above said husking rollers and extending substantially parallel with said feed belt, a holding roller mounted in said arms and adapted to engage an ear of corn when in contact with said husking rollers, and means for rotating said holding roller.

9. In a corn husking machine, the combination, with the husking rollers, of a feed belt extending transversely of said husking rollers, feed rollers carried by said belt and extending parallel with said husking rollers, and means for actuating said belt to cause said feed rollers to move transversely of said husking rollers.

10. In a husking machine, the combination, with a frame, and husking rollers journaled in said frame and extending transversely thereof, of sprocket wheels mounted near the opposite ends of said frame, sprocket chains extending about said sprocket wheels and above said husking rollers, arms carried by said sprocket chains and rollers carried by said arms and adapted to engage an ear of corn and move the same transversely of said husking rollers.

11. In a corn husking machine, the combination, with a frame, and husking rollers extending transversely thereof, of shafts mounted in said frame near the opposite ends thereof, sprocket wheels mounted on said shafts, sprocket chains extending about said sprocket wheels and above said husking rollers, feeding members carried by said sprocket chains and adapted to engage an ear of corn and move the same transversely of said husking rollers, an arm pivotally connected to one of said shafts, a roller journaled near the free end of said arm, and means for positively rotating said roller.

12. In a corn husking machine, the combination, with a frame, and husking rollers extending transversely thereof, of shafts mounted in said frame near the opposite ends thereof, sprocket wheels mounted on said shafts, sprocket chains extending about said sprocket wheels and above said husking rollers, feeding members carried by said sprocket chains and adapted to engage an ear of corn and move the same transversely of said husking rollers, an arm pivotally connected to one of said shafts, a roller journaled near the free end of said arm, means for positively rotating said roller, and a spring bearing on said arm and tending to move said roller toward said husking rollers.

13. In a corn husking machine, the combination, with the husking rollers and feed mechanism located above the same, of a curved guideway extending from a point above said feed mechanism about the end thereof to said husking rollers at a point beneath said feed mechanism.

14. In a corn husking machine, the combination, with the husking rollers, of a pair of curved plates spaced one from the other and forming a guideway leading from the upper portion of the machine to said husking rollers and feed mechanism adapted to move through said guideway.

15. In a corn husking machine, the combination, with the husking rollers, an endless belt extending longitudinally of said machine, and feeding members carried by said belt, of a pair of curved plates forming a guideway and adapted to receive the feeding members carried by said belt and guide the corn to said husking rollers.

16. In a corn husking machine, the combination, with husking rollers, of feeding mechanism comprising feeding rollers, a movable support therefor, and means for actuating said support to cause said feeding rollers to travel bodily along said husking rollers.

17. In a corn husking machine, the combination, with husking rollers, of feeding mechanism comprising feeding rollers, a movable support therefor, and means for actuating said support to cause said feeding rollers to travel bodily transversely to said husking rollers.

18. In a corn husking machine, the combination, with husking rollers, of feeding mechanism comprising arms, feeding rollers carried by the outer ends of said arms, and means for actuating said arms to move said feeding rollers transversely of said husking rollers.

19. A corn husking machine comprising a conveyer having upper and lower portions moving in different directions, a husking device arranged adjacent to the lower portion of said conveyer, and ear-supporting means arranged adjacent to the upper and lower stretches of said conveyer, said conveyer having ear-engaging members adapted, respectively, to engage the individual ears of corn while said ears are on the upper portion of said ear-supporting means and to cause said ears to move to the lower portion of said ear-supporting means, said members being further adapted to engage the said ears of corn when said ears are on the lower portion of said ear-supporting means and to move said ears into operative engagement with said husking device.

20. A corn husking machine comprising an endless belt conveyer having its upper and lower stretches moving in different directions, corn husking rollers arranged beneath and adjacent to the lower stretch of said conveyer and extending transversely to its line of movement, an ear-supporting means arranged adjacent to the upper and lower stretches of said conveyer, said conveyer having a series of ear-engaging members adapted, respectively, to engage individual ears of corn while said ears are on the upper portion of said supporting means, to move said ears of corn along said supporting means in the direction of movement of said upper stretch of said conveyer to cause said ears to move to the lower stretch of said conveyer and to further engage said ears while they are on the lower portion of said supporting means and to move them into and out of operative engagement with said husking rollers.

21. A corn husking machine comprising a conveyer having upper and lower portions moving in different directions, a husking device arranged adjacent to the lower portion of said conveyer, and a chute leading from the upper portion of said conveyer to said husking device, said conveyer having ear engaging members adapted, respectively, to engage the individual ears of corn while said members are on the upper portion of said conveyer, to move said ears of corn through said chute and to further engage the ears of corn while said members are on the lower portion of said conveyer to move said ears of corn into operative engagement with said husking device.

22. In a corn husking machine, the combination, with an ear-supporting table, of a conveyer comprising endless belts supported below the level of said table, arms secured to said belts extending above the level of said table, and ear-engaging members extending transversely to said table and secured at its opposite ends to the respective arms of said belts.

23. In a corn husking machine, the combination, with a fixed support for an ear of corn, of a conveyer comprising endless belts arranged below the supporting surface of said support, and ear-engaging members carried by said belts and extending above said supporting surface, whereby said ear-engaging members will engage the ear of corn while it rests upon said support and move the same longitudinally thereof.

24. In a corn husking machine, a support for an ear of corn, a husking device arranged beneath said support, a chute leading from said support to said husking device, and a feeding device arranged to feed an ear of corn along said support, through said chute and over said husking device.

25. In a machine of the character described, a frame, a support for an ear of corn mounted on the upper portion of said frame, mechanism mounted in the lower portion of said frame, beneath said support, to operate on an ear of corn after it has passed from said support, a guidway leading from said support to said operating mechanism, a conveyer supported on said frame between said support and said operating mechanism and comprising an endless belt having secured thereto a series of ear-engaging members, said belt being so arranged that the ear-engaging members thereof will engage the ears of corn, move the same across said table, through said guideway and past said operating mechanism.

26. In a corn husking machine, an ear-supporting table arranged to receive an ear of corn, corn husking devices arranged on a lower level than said table, a chute connecting said table with said corn-husking devices, a conveyer comprising belts arranged on opposite sides of and beneath the surface of said table and having ear-engaging members extending above said table and connected at their opposite ends with the respective belts, said belts being arranged to carry said ear-engaging members in one direction along said table and in another direction over said corn husking devices.

27. In a corn husking machine, the combination, with husking rollers, of a chute leading to said husking rollers and having an inclined portion and a substantially horizontal portion arranged adjacent to said rollers, a conveyer having an ear-engaging member arranged to move over said substantially horizontal portion of said chute, engage the ear of corn thereon, move the same into a position parallel with said husking rollers and into engagement with said husking rollers.

28. In a corn husking machine, the combination, with husking rollers, and means for holding an ear of corn in engagement therewith, endless belts mounted on opposite sides of said machine, ear engaging members connected at their opposite ends with the respective belts and arranged substantially parallel with said husking rollers, and means for actuating said belts in unison to cause said ear engaging members to move between said husking rollers and said holding means.

29. In a corn husking machine, husking mechanism comprising husking rollers, and feeding mechanism comprising a feeding roller mounted on an axis substantially parallel with the axes of said husking rollers, one of said mechanisms having bodily movement transversely to its axis, whereby said feeding roller will cause the ears of corn to move across said husking rollers transversely to their axes.

In testimony whereof, I affix my signature in presence of two witnesses.

WILLIAM W. MORRAL.

Witnesses:
SAMUEL E. MORRAL,
C. J. SCHULTZ.

Copies of this patent may be obtained for five cents each, by addressing the "Commissioner of Patents, Washington, D. C."